US012187586B2

(12) United States Patent
Eberhardt et al.

(10) Patent No.: US 12,187,586 B2
(45) Date of Patent: Jan. 7, 2025

(54) MOBILE CRANE AND PLACEMENT DEVICE FOR SAME

(71) Applicant: Liebherr-Werk Ehingen GmbH, Ehingen/Donau (DE)

(72) Inventors: Lars Eberhardt, Staig (DE); Bernd Boos, Mehrstetten (DE)

(73) Assignee: LIEBHERR-WERK EHINGEN GMBH, Ehingen/Donau (DE)

( * ) Notice: Subject to any disclaimer, the term of this patent is extended or adjusted under 35 U.S.C. 154(b) by 236 days.

(21) Appl. No.: 18/064,854

(22) Filed: Dec. 12, 2022

(65) Prior Publication Data

US 2023/0183046 A1 Jun. 15, 2023

(30) Foreign Application Priority Data

Dec. 14, 2021 (DE) ..................... 10 2021 132 913.2

(51) Int. Cl.
*B66C 23/72* (2006.01)
*B66C 23/74* (2006.01)

(52) U.S. Cl.
CPC .............. *B66C 23/72* (2013.01); *B66C 23/74* (2013.01); *B66C 2700/0371* (2013.01)

(58) Field of Classification Search
CPC ......... B66C 23/72; B66C 23/74; B66C 23/76; B66C 2700/0371; E02F 9/18; B62D 49/085
See application file for complete search history.

(56) References Cited

U.S. PATENT DOCUMENTS 4,540,097 A * 9/1985 Wadsworth ............. B66C 23/74 212/196
4,579,234 A * 4/1986 Delago .................. B66C 23/36 212/294
5,524,777 A * 6/1996 Weber ..................... B66C 23/74 212/178
5,642,821 A * 7/1997 Hafliger .................. B66C 23/42 212/231

(Continued)

FOREIGN PATENT DOCUMENTS

DE 1756466 A1 4/1970
DE 29621600 U1 2/1997
DE 202008008595 U1 11/2009

*Primary Examiner* — Michael R Mansen
*Assistant Examiner* — Juan J Campos, Jr.
(74) *Attorney, Agent, or Firm* — McCoy Russell LLP

(57) ABSTRACT

The invention relates to a mobile crane, that comprises a mobile undercarriage and a superstructure rotatably supported on the undercarriage and having a boom and a ballasting device. The ballasting device picks up or places down one or more counterweight elements by means of a hoisting device. In accordance with the invention, a placement device is provided that is connected to the undercarriage and comprises at least one movable placement part that is movable from a travel position into a placement position and vice versa. In this respect, the travel position is characterized in that the length of the undercarriage is reduced, and the crane is travelable on the construction site, whereas the placement position is characterized in that counterweight elements can be placed on the placement part by means of the ballasting device and the length of the undercarriage is increased in comparison with the travel position.

15 Claims, 8 Drawing Sheets

(56) References Cited

U.S. PATENT DOCUMENTS

| | | | | |
|---|---|---|---|---|
| 2007/0090074 | A1* | 4/2007 | Willim | B66C 23/74 212/178 |
| 2015/0246795 | A1* | 9/2015 | Copeland | E02F 9/18 212/197 |
| 2016/0185576 | A1* | 6/2016 | Bitz | B66C 23/76 212/197 |

* cited by examiner

MOBILE CRANE AND PLACEMENT DEVICE FOR SAME

CROSS REFERENCE TO RELATED APPLICATION

The present application claims priority to German Patent Application No. 10 2021 132 913.2 filed on Dec. 14, 2021. The entire contents of the above-listed application are hereby incorporated by reference for all purposes.

TECHNICAL FIELD

The present invention relates to a mobile crane, in particular to a crawler crane, in accordance with the preamble of claim 1 and to a placement device for said crane.

BACKGROUND

Mobile cranes or traveling cranes typically have an undercarriage having a wheeled chassis or a crawler chassis, a superstructure rotatably supported on the undercarriage, a boom pivotably or luffably attached to the superstructure, and a counterweight device. The counterweight produces a counter torque to the load torque via a lever arm in every position of the superstructure and therefore rotates along with the superstructure.

It is known from the prior art here to configure the counterweight device as a ballasting device that is able to actively pick up and place down counterweight element or counterweight plates placed down outside the superstructure. The ballasting device for this purpose typically comprises one or more ballast cylinders as a hoisting device, said ballast cylinders being able to extend downward, to engage into the counterweight elements, and to hoist them upward to the superstructure. Such a ballasting device is known, for example. from DE 296 21 600 U1.

SUMMARY

With mobile cranes whose undercarriages have a wheeled chassis, the counterweight elements can as a rule be placed down directly on the undercarriage and can be raised from this position to the superstructure by means of the hoisting device.

With crawler cranes, however, no placement area is provided as standard in the range of the ballasting device of the superstructure so that the counterweight elements typically have to be placed down on the ground and be picked up from there by means of the ballasting device. Since, however, there is in particular frequently no flat surface available in the construction site area in which crawler cranes are deployed, problems can occur in the placing down or picking up of the counterweight elements.

Preparing the counterweight on the ground for the installation on the superstructure of the crawler crane and stacking it thereon moreover has the general disadvantage that there is no spatial relationship between the positions of the counterweight mount on the superstructure and the stacked counterweight elements. The alignment of said elements with respect to one another is extremely complex at times.

It has therefore been proposed in DE 20 2008 008 595 U1 to provide a cantilever frame on the undercarriage of a crawler crane for the placement of counterweight plates from where the counterweight plates can be picked up by the ballasting device at a specific rotational position of the superstructure. It is, however, disadvantageous in this solution that the cantilever frame can only be separated from the undercarriage in a complex manner It consequently remains attached to the undercarriage as a rule. This makes the undercarriage longer and thus degrades its maneuverability (greater turning radius of the undercarriage) on the construction site.

Against this background, it is the underlying object of the present invention to further develop a mobile crane of the category such that a ballasting from the ground is avoided, but at the same time the maneuverability of the crane is not impaired.

This object is satisfied in accordance with the invention by a mobile crane having the features of claim 1 and by a placement device having the features of claim 15. Advantageous embodiments of the invention result from the dependent claims and from the following description.

Accordingly, on the one hand, a mobile crane, in particular a crawler crane, is proposed that comprises a mobile undercarriage and a superstructure rotatably supported on the undercarriage and having a boom and a ballasting device. The ballasting device is adapted to pick up or place down one or more counterweight elements by means of a hoisting device. The hoisting device can be one or more hydraulic ballast cylinders, for example.

In accordance with the invention, a placement device is provided that is connected to the undercarriage and comprises at least one movable placement part that is movable from a travel position into a placement position and vice versa. In this respect, the travel position is characterized in that the length of the undercarriage is reduced, in particular minimized, whereas the placement position is characterized in that counterweight elements can be placed on the placement part (or can be picked up by it) by means of the ballasting device and the length of the undercarriage is increased, in particular maximized to a required degree, in comparison with the travel position. No counterweight elements are preferably supportable on the placement device or placement part in the travel position whereas the crane is movable on the construction site in the travel position. The placement position can also be called an installation position.

Ballasting from the undercarriage is possible by the solution in accordance with the invention, which facilitates the positioning of the counterweight elements and of the ballasting device with respect to one another and does not require a flat surface. The possibility of moving the placement device into a space saving travel position after ballasting has taken place at the same time provides good maneuverability of the crane in the ballasted state since the undercarriage is in particular not increased significantly in length with respect to conventional models.

The placement device is considered as part of the undercarriage in the present case (at least in a state in which the placement device is installed on the undercarriage). A decrease or increase of the length of the placement device thus corresponds to a decrease or increase of the length of the undercarriage.

It is conceivable in practice that the movable placement part (in the following only called a placement part) can be pivoted, displaced or extended, folded, or otherwise moved. A combination of a plurality of movement forms is also conceivable. The placement part is, however, preferably simply pivoted about a pivot axle that is in particular vertically aligned to move it to and fro between the travel position and the placement position. In the travel position, the placement part is preferably folded inward and folded outward in the placement position.

Provision is made in a possible embodiment that the placement device is adapted to remain at the undercarriage during crane operation and/or during the moving of the crane. In principle, the placement device could be a fixed component of the undercarriage and can be fixedly attached, for example welded, to the frame or center frame part of the undercarriage. A releasable connection to the undercarriage or to its center frame part is preferred, however, due to the higher flexibility. The placement device could thus also be fully dismantled from the crane as required, for example to reduce weight for road transport. In this case, the placement device can have corresponding connection means for a releasable connection to the undercarriage or to a frame or center frame part of the undercarriage.

Provision is made in a further possible embodiment that the at least one placement part extends substantially transversely to the longitudinal axis of the undercarriage in the travel position and can be outwardly pivoted in the placement position in which the at least one placement part in particular extends substantially in parallel with the longitudinal axis of the undercarriage.

The at least one placement part preferably has one or more placement areas at an upper side on which counterweight elements can be placed. A defined placement or contact surface thereby results for the counterweight element or elements so that it/they can be supported, and optionally positioned, in a stable and secure manner Provision is made in a further possible embodiment that the placement part is pivotably supported about a vertical pivot axle. The pivot axis is here preferably off center, i.e. laterally offset with respect to the longitudinal axis of the undercarriage, and in particular at the side of the placement device. In the travel position, the placement part preferably lies on the placement device (or on that part of the placement device that comprises the pivot axle) whereas it projects therefrom in the placement position.

The support of the placement part can take place via one or more low friction bronze bushes.

Provision is made in a further possible embodiment that the pivotable support of the at least one placement part takes place via two separate pivot bearings that are arranged above one another. The pivot axle here can be divided into two in its entirety, with one of the divided pivot axles being able to be assigned to each pivot bearing in the latter case. The pivot bearings are preferably configured differently, i.e. are not of the identical shape. Two pivot bearings are preferably provided per placement part, with in principle also more than two pivot bearings per placement part being conceivable.

Provision is made in a further possible embodiment that a lower pivot bearing is thicker than an upper pivot bearing. This can in particular mean that the lower pivot bearing has a greater thickness, at least in the vertical direction, than the upper pivot bearing.

The upper pivot bearing is preferably adapted to take up predominantly horizontal forces. Alternatively or additionally, the lower pivot bearing can be adapted to take up horizontal and vertical forces, in particular predominantly the vertically acting weight force of the counterweight elements placed on the placement part.

Provision is made in a further possible embodiment that the at least one placement part has locking means by means of which it can be locked in the travel position and in the placement position respectively. Provision can be made here that the locking takes place manually, for example by placing a locking bolt, or via an actuator.

It is likewise conceivable that the at least one placement part is pivoted by means of an actuator, in particular a hydraulic cylinder, with the locking of the placement part taking place via a fixing or locking of the actuator.

The simplest design results, however, when a locking bolt is placed to lock the at least one placement part, in particular manually, and is able to be pushed into corresponding bolt mounts.

Provision is made in a further possible embodiment that the locking means are formed at one of the pivot bearings, in particular at an upper pivot bearing. They can be fastened to the pivot bearing or can be formed integrally therein.

The locking means preferably comprise or are cutouts, in particular bolt mounts, into which a locking element, in particular a locking bolt, can be pushed in the corresponding travel or placement position of the placement part.

Provision is made in a further possible embodiment that the placement device comprises a first and a second placement part, that is at least two movable placement parts, on which counterweight elements can be placed in the placement position. The placement parts are preferably pivotable about vertical (i.e. parallel) pivot axles that are spaced apart from one another and that are in particular located laterally at oppositely disposed sides of the placement device. Exactly two movable placement parts are preferably provided.

Provision is made in a further possible embodiment that the placement device comprises two parallel frame parts, in particular plate-like frame parts or frame plates, to whose front sides the placement parts are connected in an articulated manner The frame plates are preferably connected, in particular bolted, directly to the undercarriage.

The term “plate-like frame part” or “frame plate” is to be given a broad interpretation here and is not restricted to actual (continuous) plates. Flat frame parts are rather also covered thereby having cutouts and/or bracings, for example checkered elements or framework elements. The frame parts are, however, preferably thick metal sheets or side walls in which the pivot axles of the placement parts are received.

The frame parts in particular conduct the forces exerted by the placed down counterweight elements into the undercarriage construction or the center frame part.

Provision is made in a further possible embodiment that the frame parts have different extents or lengths in the direction of the longitudinal axis of the undercarriage and that the pivot axles of the placement parts have a different distance from the undercarriage or center frame part (i.e. also a different distance from the axis of rotation of the superstructure). It is thereby possible to arrange the placement parts “behind one another” in the travel position, i.e. the inwardly folded placement parts are not disposed in a common plane.

The placement parts are preferably plate-like and are respectively aligned in parallel with one another in the travel and placement positions, i.e. the flat sides of the placement parts face one another. The distance of the parallel placement parts from one another in the travel position is in particular smaller than in the placement position.

The placement parts are therefore in particular outwardly pivoted from the travel position by 90° into their placement position. In principle, however, maximum pivot angles for the placement position are also conceivable that are greater or smaller than 90°, for example a maximum pivot angle between 45° and 90° or between 90° and 135°. This can also depend on the size and shape of the counterweight elements to be placed down and on the width of the undercarriage. It must ultimately be ensured that the counterweight elements are supportable in a secure and stable manner on the placement parts that are outwardly pivoted or in the placement position.

Provision is made in a further possible embodiment that the placement device comprises at least one centering element that is configured to cooperate with a corresponding counter-centering element at the lower side of a counterweight element for the fine positioning of the counterweight element to be placed on the placement device. It is thereby ensured that the hoisting device of the ballasting device can precisely take up the counterweight elements. The counterweight elements are correctly aligned by the centering element so that a complex manual alignment can be dispensed with.

The at least one centering element is preferably arranged at an upper side of the placement device and/or is formed as an upwardly protruding projection. A corresponding recess into which the projection travels on the placement can be provided as a counter-centering element at the counterweight element. The recess can be chamfered or conical in the region of the opening to facilitate the placement or the introduction of the centering element.

At least two centering elements are provided in a further possible embodiment. In this respect, at least one centering element is fixedly connected to each of the frame parts, i.e. the centering elements do not move along with the placement parts. Since the positions of the centering elements require a high accuracy, an attachment to the movable placement parts would not be constructive.

A separation of the centering elements and the placement parts is therefore ideally provided so that the relative position of the centering elements with respect to the axis of rotation of the superstructure is always identical. The advantage further results that the force that occur on the alignment of the counterweight elements are not to be conducted via the pivot bearings of the placement parts. The centering elements are furthermore sensibly not attachable to the placement parts due to their space requirements and are consequently advantageously fastened as weld constructions to the frame parts. Bracings between the placement parts are hereby avoidable and the number of loose parts is reduced.

Provision is made in a further possible embodiment that the placement device comprises a ballast element and acts as central ballast. In this respect, any structure can be considered a ballast element whose primary function is the generation of a corresponding weight force. The central ballast does not move along with the superstructure or the load, but rather generally increases the mass of the undercarriage and acts independently of the position/location of the load.

Such a central ballast could in principle be provided both at the front and at the rear at the undercarriage, with either a central ballast (for example the rear one) or even both central ballast devices being able to be formed as a placement device.

The ballast element can be integrated in the bearing structure of the placement device (is formed in one piece of fixedly connected) or can be releasably connected thereto, for example by means of bolts and/or screws.

The placement device can be considered either as a central ballast itself or as part of the central ballast.

The placement device, as described above, preferably comprises two parallel frame parts, in particular frame plates, to whose front sides a respective placement part is connected in an articulated manner, with the ballast element being arranged between the frame parts. The frame parts and the ballast element can be fixedly or non-releasably connected to one another or they can be releasably connected to one another, for example by means of bolts and/or screws.

The placement device could alternatively also be directly attached to the center frame part of the undercarriage. It is in in principle conceivable here that the at least one pivotable placement part is directly connected in an articulated manner to the center frame part of the undercarriage. Two pivotable placement parts are preferably in turn provided, with their pivot axles advantageously being arranged offset from one another, as described above. In such an embodiment, only one of the two placement parts could also be fastened to the frame part to facilitate the offsetting of the pivot axles. Instead of a frame part, the rearwardly offset placement part could, however, also be pivotably supported at a projection of the center frame part or at a different element connected to the center frame part.

The at least one placement part can be movable manually or by means of an actuator, in particular a hydraulic cylinder.

The present invention furthermore relates to a placement device for a crane in accordance with the invention. In this respect, the same advantages and properties obviously result as for the crane in accordance with the invention so that a repeat description will be dispensed with at this point.

BRIEF DESCRIPTION OF THE FIGURES

Further features, details, and advantages of the invention result from the embodiment explained in the following with reference to the Figures. There are shown.

DETAILED DESCRIPTION

Figure 1:
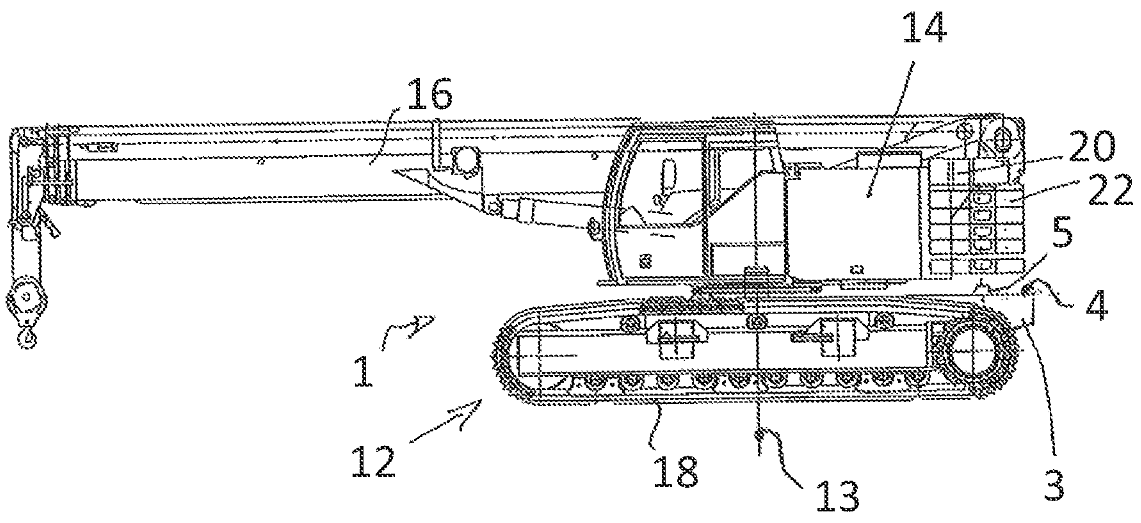
Fig. 1 Prior Art
FIG. 1: a crawler crane known from the prior art in a side view.

A crawler crane 1 of the category such as is known from DE 20 2008 008 595 U1 is shown in FIG. 1. The crane 1 has an undercarriage 12 with a crawler chassis comprising two crawler carriers 18. A superstructure 14 is rotatably supported on the undercarriage 12 about a vertical axis of rotation 13 via a rotational connection 7 (see FIG. 6). The superstructure 14 comprises a boom 6 (here: a telescopic boom) luffable about a horizontal axis and a ballasting device 20.

Plate-like counterweight elements 22, 22' can be taken up and placed down by means of the ballasting device 20 at the superstructure 14 in a manner known per se by means of a hoisting device 24 (i.e. at the superstructure 14 to form the superstructure ballast). As can be recognized in FIG. 9, the hoisting device 24 comprises one or more hydraulic ballast cylinders 24 that are arranged in the ballasting device 20 and whose piston rods can be extended downwardly. In a manner known per se, the piston rods move (with a correct positioning of the superstructure 14 relative to the counterweight elements 22, 22') through corresponding recesses in the counterweight plates 22, 22' and can be locked or brought into engagement therewith. This can take place, for example, in accordance with DE 296 21 600 U1, but also in any different manner The counterweight plates 22, 22' are raised to the ballast mount of the ballasting device 20 and thus to the superstructure 14 by retracting the piston rods of the ballast cylinders.

Provision can be made in this respect that the counterweight plates 22, 22' can be connected to the ballasting device 20 or to the ballast mount. Provision can alternatively or additionally be made that the pressure in the ballast cylinders is maintained, for example by corresponding hydraulic reservoirs, such that the counterweight plates 22, 22' remain at the superstructure 14.

Figure 6:
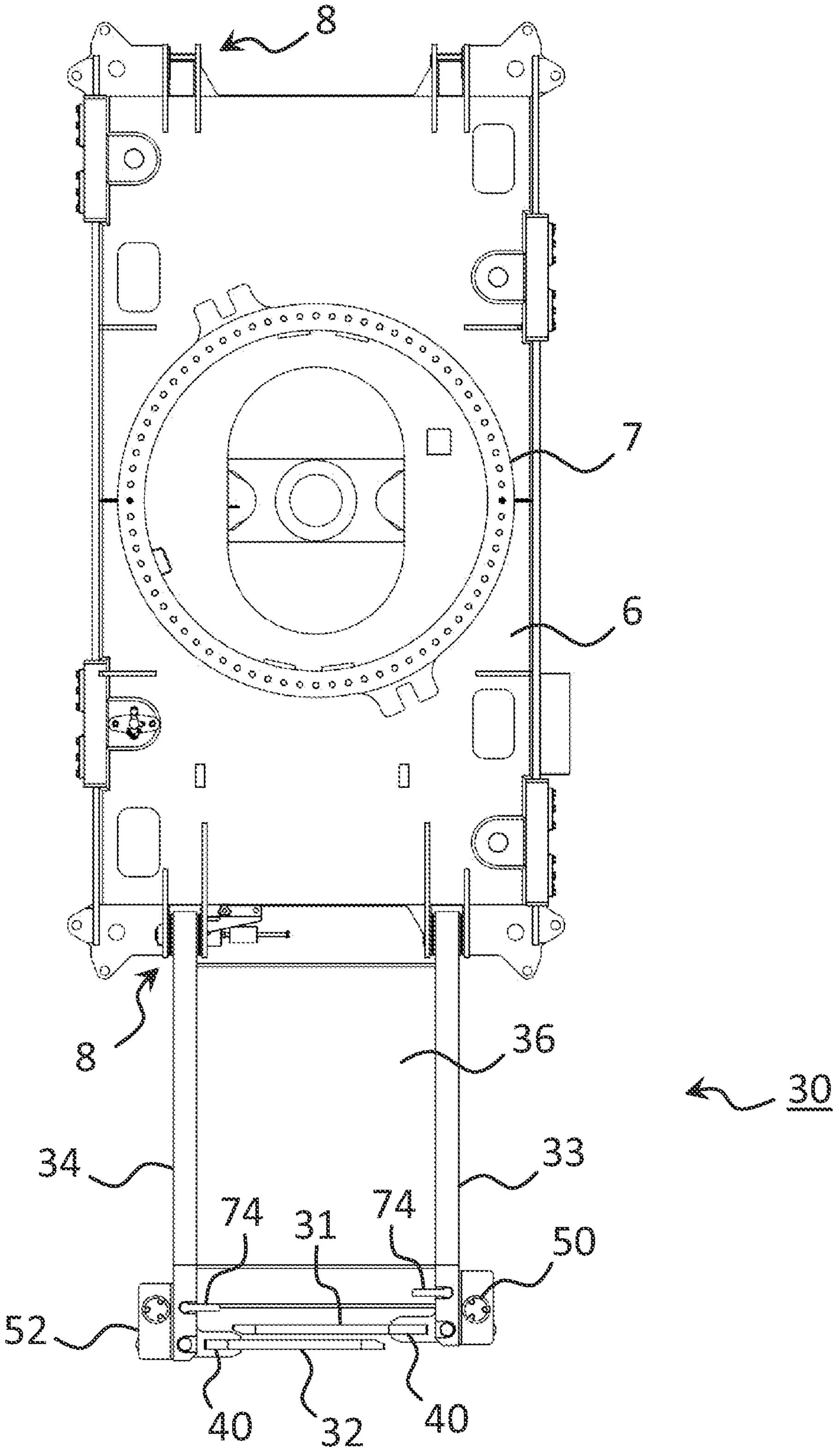
FIG. 6: a plan view of the undercarriage with the placement device in accordance with the invention in the travel position.

With the crane 1 shown in FIG. 1, a cantilever frame 3 is fastened to the undercarriage 12 (more precisely to the center frame part 6 of the undercarriage 12, cf. FIG. 6) between the crawler carriers 18, with said counterweight plates 22, 22' being placeable on said undercarriage 12. The cantilever frame 3 has a suitable placement area 4 for supporting the counterweight plates 22, 22' at the upper side and has one or more centering element 5 that move the counterweight plates 22, 22' into a defined position with respect to the axis of rotation 13 of the superstructure 14. This cantilever frame 3 can, however, only be dismantled from the undercarriage 12 in a complicated manner and therefore remains at the undercarriage 12 as a rule. It is thereby extended in the longitudinal direction, which has a negative effect on the maneuverability of the crane 1.

Figure 2:
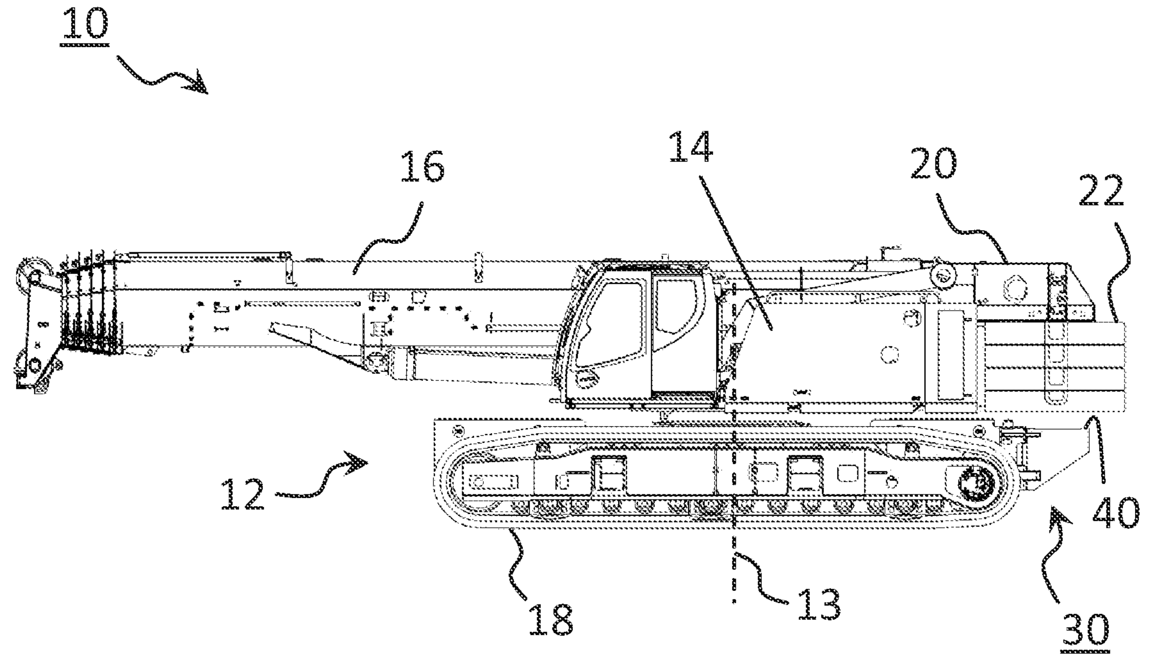
FIGS. 2-3: the crane in accordance with the invention in accordance with a preferred embodiment as a crawler crane in a side view.
Figure 3:
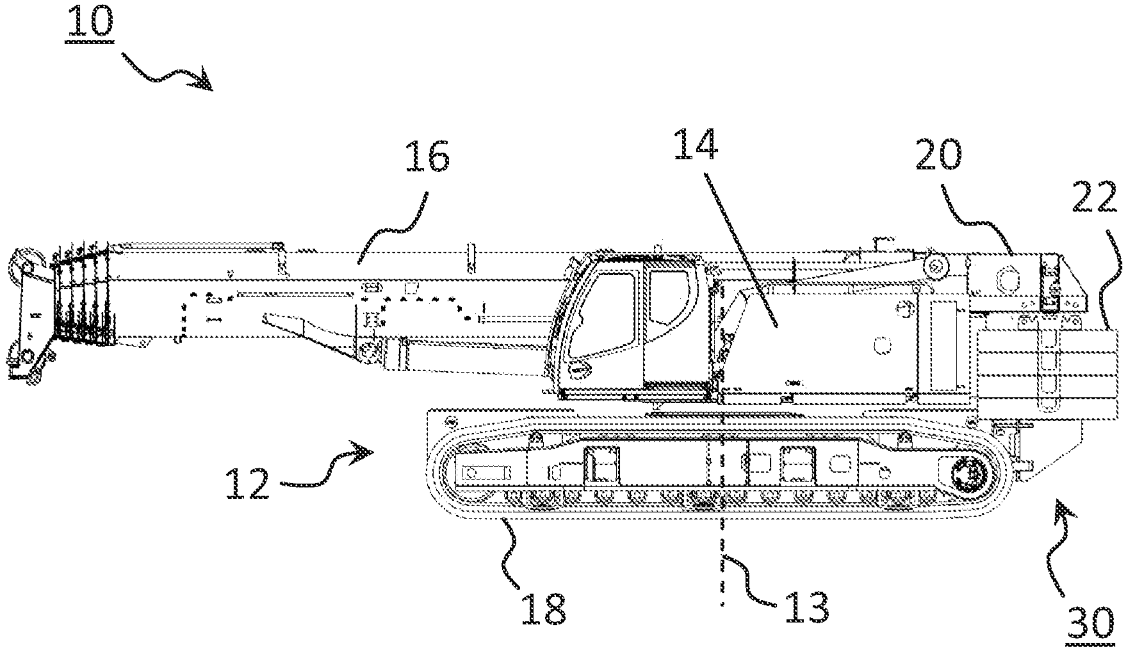

For this reason, with the crane 10 in accordance with the invention, that is shown in a side view in FIGS. 2-3, a foldable placement device 30 is provided instead of the cantilever frame 3 (but at the same position, i.e. between the crawler carriers 18), said placement device 30 being able to be moved into a placement position (as shown in FIGS. 2-3) that increases the length of the undercarriage 12 for the support of the counterweight plates 22, 22' and can be moved into a travel position reducing the undercarriage length to travel the crane 10. The device in accordance with the invention thereby takes up the advantages of DE 20 2008 008 595 U1 without having to achieve this by a reduction in the maneuverability of the crane 10.

Figure 9:
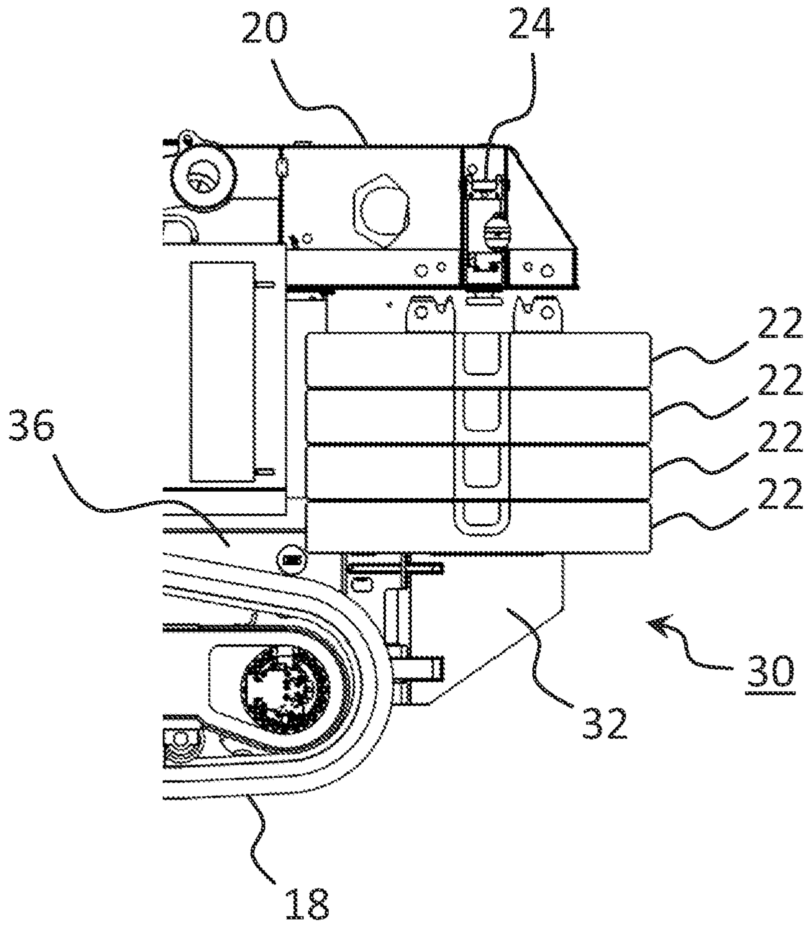
FIG. 9: an enlarged view of the crane in accordance with FIG. 3 in the region of the placement device.

FIG. 2 shows the crane 10 in accordance with the invention with the placement device 30 in the placement position, with the counterweight plates 22, 22' being raised by the ballast cylinders 24. The counterweight plates 22, 22' are in contrast placed on the placement device 30 in FIG. 3. An enlarged view of the placed down weight plates 22, 22' in accordance with FIG. 3 is shown in FIG. 9.

Figure 4:
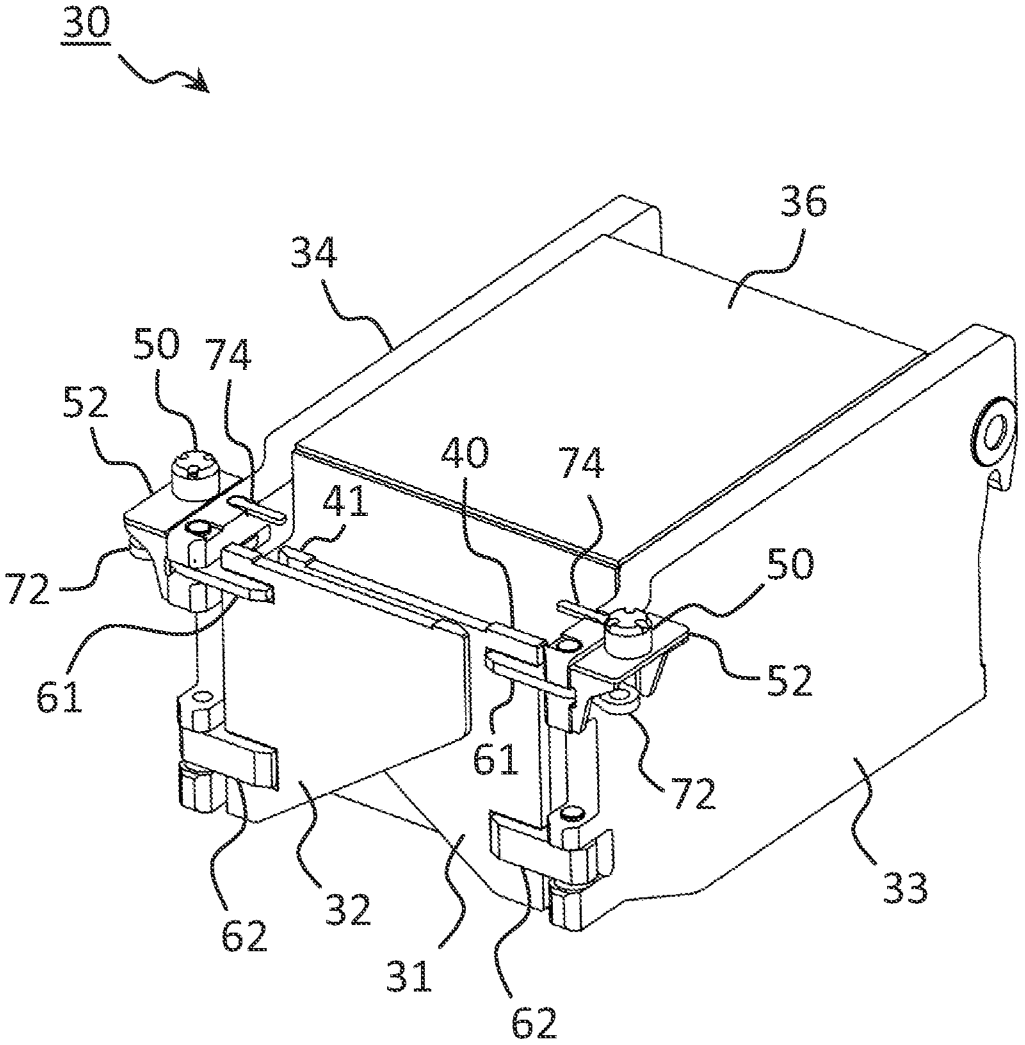
FIG. 4: a perspective view of the placement device in accordance with the invention in accordance with the preferred embodiment in the travel position.
Figure 5:
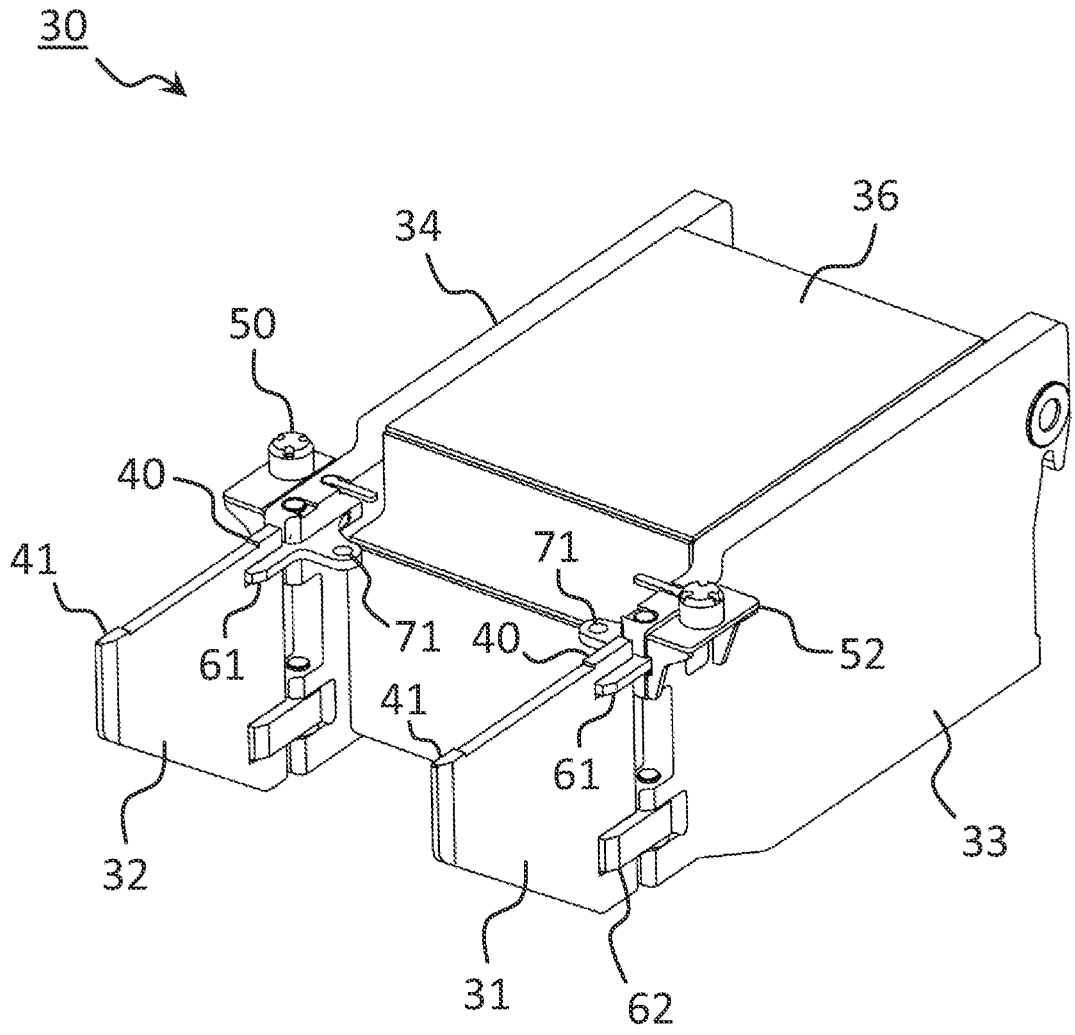
FIG. 5: the placement device in accordance with FIG. 4 in the placement position.

FIG. 4 (in the travel position here) and FIG. 5 (in the placement position here) show a perspective view of the placement device 30 in accordance with the invention in accordance with a preferred embodiment. A plan view of the undercarriage 12, more precisely its center frame part 6 with a placement device 30 fastened thereto can be seen in FIG. 6.

The placement device 30 in accordance with the invention is at the same time configured as central ballast for the crane 10 in the embodiment shown here and has a corresponding ballast element 36. The placement device 30 comprises plate-like frame parts 33, 34, that can also be called side walls 33, 34 of the ballast element 36, at the side, that is at the sides of the ballast element 36 facing the crawler carriers 18. These side walls 33, 34 are formed as comparatively thick to be able to reliably take up the forces that occur and to be able to transfer them to the center frame part 6 of the undercarriage 12. The side walls 33, 34 have connection means, via which the placement device 30 is releasably connectable to corresponding connection means 8 of the center frame part 6, at the ends or front sides facing the center frame part 6.

The ballast element 36 can be fixedly, i.e. non-releasably, or releasably connected to the frame parts 33, 34, for example by means of screws and/or bolts. The ballast element 36 can be integrated in the bearing structure of the placement device 30.

The placement device 30 in accordance with the invention can be simply retrofitted in existing cranes by the linking of the function or assembly of "foldable counterweight placement area" with the central ballast. The reworked central ballast is attached to the center frame part 6 of the crawler crane 10 for this purpose.

In an alternative embodiment, the placement parts 31, 32 could be directly connected in an articulated manner to the center frame part 6 of the undercarriage 12 without the frame parts 33, 34, that is in particular the placement device 30 can be attached to the undercarriage 12 without a ballast element 36 and side walls 33, 34.

As can be seen in FIG. 6, connection means 8 are likewise provided at the oppositely disposed side of the center frame part 6 to optionally be able to fasten a further central ballast or a second placement device 30 (or to be able to fasten a single placement device 30 as required on the one or other side of the center frame part 6).

Alternatively, the placement device 30 could also be provided and/or be fixedly (i.e. non-releasably) fastened to the center frame part without a ballast element 36.

At the ends of the side walls 33, 34 (in the embodiment shown here, they are the ends disposed opposite the connection means to the center frame part 6) remote from the axis of rotation 13 of the superstructure 14, plate-like placement parts 31, 32 are pivotably supported that can also be called folding metal sheets 31, 32. For this purpose, each side wall 33, 34 has a pivot axle divided into two (with an upper and lower pivot axle) that is integrated into the metal sheet of the respective side wall 33, 34. The corresponding support parts can be low friction bronze bushes.

To reduce the weight and to optimally introduce the forces into the side walls 33, 34, the placement parts 31, 32 in the present case are shaped more or less as triangular or have a chamfered side, with other shapes naturally also being conceivable, for example a rectangular shape.

In the travel position, the placement parts 31, 32 are folded in and contact the ballast element 36 (cf. FIGS. 4 and 6). For this purpose, the side walls 33, 34 project beyond the ballast element 36 in the longitudinal direction of the undercarriage so that the placement parts 31, 32 can be folded inwardly. In the travel position, the surfaces of the placement parts 31, 32 face one another and toward the front side of the ballast element 36. The length of the placement device 30 (and thus of the total undercarriage 12) is minimized in the travel position and is only insignificantly larger than if the placement parts 31, 32 were not provided.

In the placement position (cf. FIGS. 5 and 7), the placement parts 31, 32 are folded outwardly by 90° about their pivot axles so that they are aligned in parallel and extend along the longitudinal axis of the undercarriage. This corresponds to the maximum length of the placement device 30 (and of the undercarriage 12).

The placement parts 31, 32 each have an upper pivot bearing 61 associated with the upper pivot axle and a lower pivot bearing 62 associated with the lower pivot axle. The upper pivot bearing 61 is primarily adapted to take up the horizontal forces. The lower pivot bearing 62 is primarily provided to take up forces in the vertical direction (this is substantially the weight force of the counterweight plates 22, 22' placed on the placement parts). For this purpose, the lower pivot bearing 62 is thicker/higher than the upper pivot bearing 61. The lower pivot bearing 62 naturally also has to take up the oppositely disposed horizontal forces from the force pair together with the upper pivot bearing 61.

Alternatively or additionally, the upper and lower pivot axles can be of different thicknesses to be able to ideally take up and introduce the differently acting forces.

The placement parts 31, 32 can each be locked in the travel and placement positions. For this purpose, in the embodiment shown in the present case, two respective recesses or bolt mounts 71, 32 that act as first and second locking means 71, 72 are formed in the upper pivot bearings 61. A locking bolt 74 is furthermore provided with a handle in each of the two side walls 33, 34, with the locking bolt 74 being pushable into the first bolt mount 71 in the travel position and into the second bolt mount 72 in the placement position to lock the corresponding placement part 31, 32 in this position. The side walls 33, 34 are thick enough to completely receive the locking bolts 74.

In the embodiment shown here, the locking bolts 74 are manually pushed into the bolt mounts 71, 72. The placement parts 31, 32 are likewise manually pivoted between the travel and placement positions. The locking and/or pivoting can, however, alternatively also take place by corresponding actuators, for example hydraulic cylinders.

Figure 7:
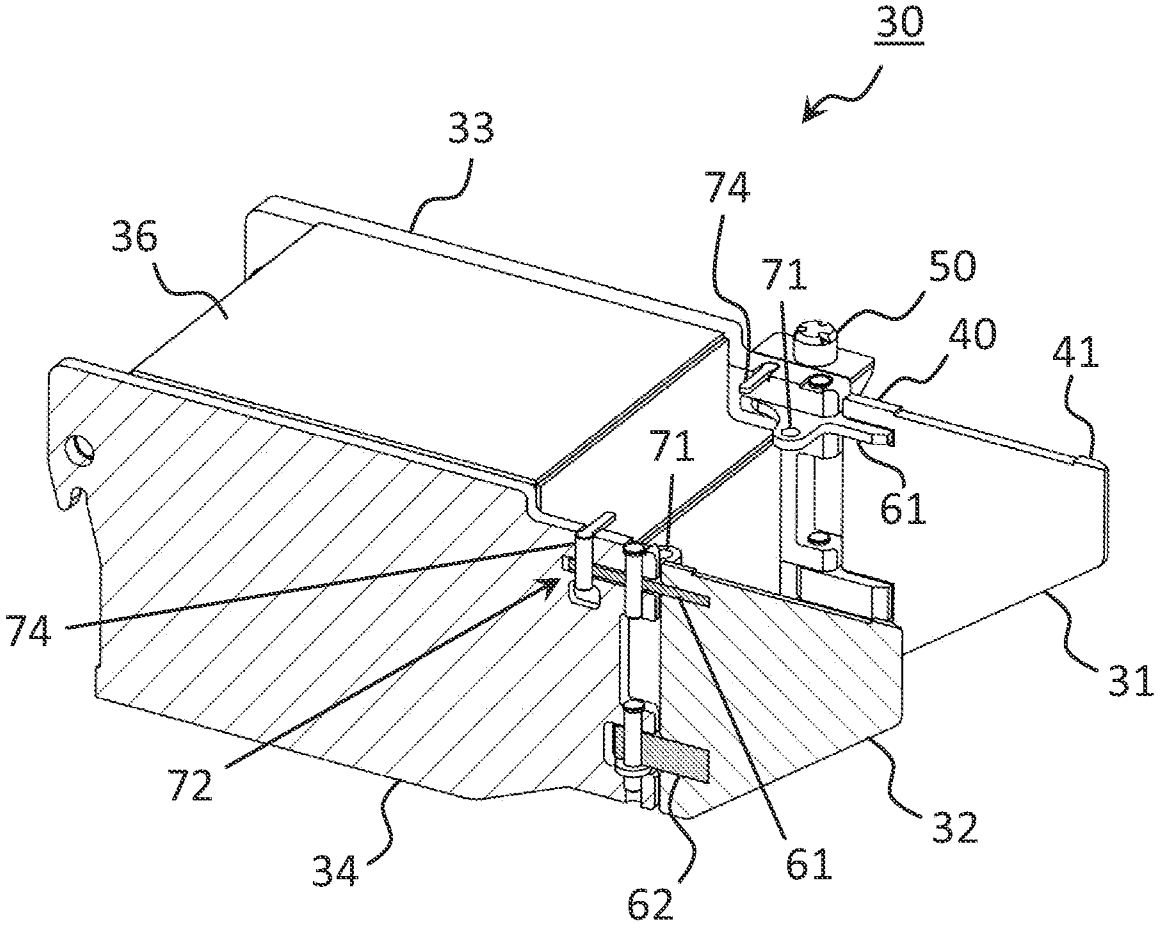
FIG. 7: a section through one of the frame parts of the placement device in a perspective view.

The locked placement position is shown in a sectional view through the left side wall 34 in FIG. 7, with here the locking bolt 74 supported in a vertical bore of the side wall 34 being able to be recognized that extends through the second bolt mount 72 of the left placement part 32 and locks the latter. It is analogous with the right placement part 31. The first bolt mounts 71 are within the outwardly folded placement parts 31, 32 in this position.

In principle, the bolt mounts 71, 72 could also be formed in the lower pivot bearing 62 and the locking bolts 74 could correspondingly be supported in the lower regions of the side walls 33, 34.

Both placement parts 31, 32 carry out a pivot movement about their respective pivot axles. Consequently, they cannot be arranged in a common plane in the travel position due to the required distance from the axis of rotation 13 and thus also due to their own required lengths. For this reason, one of the pivot axles of the placement parts 31, 32 has a greater distance from the axis of rotation 13 or from the ballast element 36 than the pivot axle of the other placement part 31 (see FIG. 6). The corresponding placement part 31 is therefore in front of the other placement part 31 viewed from the axis of rotation 13 or from the ballast element 36. To achieve this, the side wall 34 (the left wall in FIG. 6) is longer than the other side wall 33.

As already stated, the respective side wall 33 and 34 also serves as a mount for the locking bolt 74. To avoid a complex weld construction, the side walls 33, 34 are particularly thick. The bores for the receivers of the locking bolts 74 are thus directly introduced into the metal sheets of the side walls 33, 34 and there is still enough material for a secure connection.

The total central ballast 30 has a new design in comparison with known cranes to be able to satisfy the set tasks. This includes the thick side walls 33, 34 and the thick connection elements 8 to the undercarriage 12 or center frame part 6, the different designs of the side walls 33, 34, the placement parts 31, 32 connected in an articulated manner, and the locking mechanism 71, 72, 74.

An operating error must also be taken into account here. The counterweight mount device or the ballasting device 20 has thick ballast cylinders 24. If the superstructure 14 is not in the correct position to travel into the cutouts provided for this purpose in the counterweight plates 22, 22', the ballast cylinders 24 press onto the counterweight plates 22, 22' and increase the load on all the components. The placement device 30 is adapted to such a case and all the major elements are correspondingly dimensioned.

The placement parts 31, 32 have placement areas 40, 41 on the upper sides that are contacted by the lowest placed down counterweight plate 22' or on which the latter is supported. A defined contact surface thereby results for the counterweight. Each placement part 31, 32 has a rear placement area 40 in the region of the pivot axle and a front placement area 41 at the oppositely disposed end (in a plan view). The rear placement area 40 of the placement part 32, whose pivot axle is further spaced apart (at the left in FIG. 5) from the axis of rotation 13 of the superstructure is shorter than the rear placement area 40 of the other placement part to compensate the offset of the pivot axles. This is, however, not compulsory. More than two placement areas per placement part and/or a different positioning are naturally furthermore also conceivable. The spacing of the placement areas 40, 41 per placement part 31, 32 is selected such that a secure contact of the counterweight plates 22, 22' is ensured before their installation on the superstructure 14.

Two centering elements 50 are provided to precisely position the counterweight plates 22, 22' or to exactly fix their alignment and position relative to the axis of rotation 13 of the superstructure 14 and thus to enable a smooth engagement of the ballast cylinders 24 in the corresponding cutouts of the counterweight plates 22, 22'

The centering elements 50 are outwardly attached to the side walls 33, 34, and indeed in the region of the locking bolts 74 (cf. FIGS. 4-5). The centering elements 50 themselves require a high accuracy in their location with respect to the axis of rotation 13 of the superstructure 14. An attachment to the pivotable placement parts 31, 32 would consequently not be constructive. The centering elements 50 are therefore separate from the placement parts 31, 32 and are instead fixedly connected or welded to the side walls 33, 34. This solution additionally brings about the advantage that the forces that occur on the alignment of the counterweight plates 22, 22' are not to be conducted via the pivot bearings 61, 62. The centering elements 50 can furthermore not sensibly be attached to the placement parts 31, 32 due to their space requirement.

Figure 8:
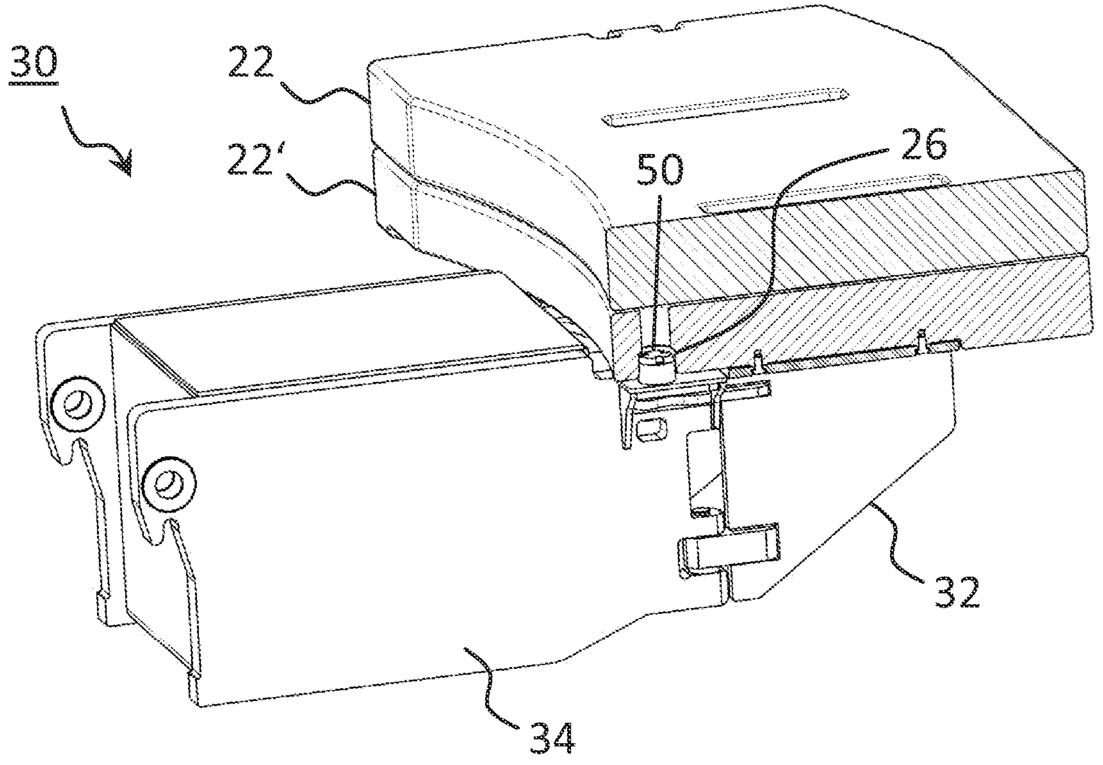
FIG. 8: the placement device in accordance with the invention in the placement position with two counterweight elements placed thereon in a perspective sectional view through the counterweight elements.

The centering elements 50 are arranged at upper sides of fastening pieces 52 laterally welded to the side walls 33, 34 and project upwardly. In the embodiment shown here, the centering elements 50 are substantially of cylindrical shape and have an introduction chamfer (i.e. the upper edge is chamfered to enable an easier threading), with other shapes also being conceivable. The lowest counterweight plates 22,' has complementary recesses or counter-bores 26 at the corresponding points at the lower side and the centering elements 50 travel into them on the placing down of the counterweight plates 22' (cf. the sectional view of FIG. 8).

If the crane operator stacks the counterweight plates 22, 22' on the undercarriage 12 using his own boom 16, he lowers the first counterweight plate 22' in its approximate position. In this respect, the recesses 26 in the counterweight plate 22' contact the centering elements 50 and the counterweight plate 22' is aligned in its assembly position. The counterweight plate 22' lies on the placement areas 40, 41 by a further lowering of it. Further counterweight plates 22 are stacked in an analogous manner The lowest counterweight plate 22' can also have further connection means known from the prior art for the connection to the superstructure 14 (cf. FIG. 9). The further counterweight plates 22 can in particular have recesses through which connection elements of the lowest counterweight plate 22' project in the stacked state and that serve the fastening of the ballast stack 22, 22' on the superstructure 14.

The further counterweight plates 22' can be formed identically or differently.

Instead of continuous side walls 33, 34 or metal side plates, other designs, e.g. lattice-like or checkered frame structures, can also be used. This also applies alternatively or additionally to the placement parts 31, 32.

REFERENCE NUMERAL LIST

1 crawler crane (prior art)
3 cantilever frame
4 placement area
5 centering element
6 center frame part
7 rotary connection
8 connection means
10 mobile crane (crawler crane)
12 undercarriage
13 axis of rotation
14 superstructure
16 boom
18 crawler chassis
20 ballasting device
22 counterweight element
22' lowest counterweight element
24 hoisting device (ballast cylinder)
26 centering counter-element (recess)
30 placement device
31 first placement part
32 second placement part
33 first frame part (side wall)
34 second frame part (side wall)
36 ballast element
40 rear placement area
41 front placement area
50 centering element
52 fastening piece
61 upper pivot bearing
62 lower pivot bearing
71 first locking means (bolt mount)
72 second locking means (bolt mount)
74 locking element (locking bolt)

The invention claimed is:

1. A mobile crane, comprising a mobile undercarriage and a superstructure rotatably supported thereon and having a boom and a ballasting device, wherein the ballasting device is adapted to take up or place down one or more counterweight elements by means of a hoisting device, wherein a placement device connected to the undercarriage and having at least one movable placement part that is movable from a travel position reducing the length of the undercarriage into a placement position which increases the length of the undercarriage and in which counterweight elements can be placed on the placement part by means of the ballasting device, and vice versa.

2. A crane in accordance with claim 1, wherein the placement device is adapted to remain at the undercarriage during crane operation and/or during the traveling of the crane.

3. A crane in accordance with claim 1, wherein the placement part extends substantially transversely to the longitudinal axis of the undercarriage in the travel position and is outwardly pivotable into the placement position in which the placement part extends substantially in parallel with the longitudinal axis of the undercarriage, with the placement part having one or more placement areas at an upper side on which counterweight elements can be placed.

4. A crane in accordance with claim 3, wherein the placement part is pivotably supported about a vertical pivot axle, with the pivot axle being off center with respect to the longitudinal axis of the undercarriage, including laterally at the placement device.

5. A crane in accordance with claim 3, wherein the placement device comprises a first placement part and a second placement part on which counterweight elements can be placed in the placement position, with the placement parts being pivotable about vertical pivot axles that are spaced apart from one another and that are located laterally on oppositely disposed sides of the placement device.

6. A crane in accordance with claim 5, wherein the placement device comprises two parallel frame parts, including frame plates, to whose front sides the placement parts are connected in an articulated manner, with the frame parts being directly connected to the undercarriage.

7. A crane in accordance with claim 6, wherein the frame parts have different lengths in the direction of the longitudinal axis of the undercarriage and the pivot axles of the placement parts have different distances from the undercarriage, with the placement parts being plate-like and being respectively aligned in parallel with one another in the transport position and placement position.

8. A crane in accordance with the preceding claim and in accordance with one of the claim 6, wherein at least two centering elements are provided, with at least one centering element being fixedly connected to each of the frame parts.

9. A crane in accordance with claim 1, wherein the pivotable support of the placement part takes place via two separate pivot bearings that are arranged above one another and are designed differently.

10. A crane in accordance with claim 9, wherein the placement part has locking means by means of which it can be locked in the travel position and in the placement position respectively.

11. A crane in accordance with claim 10, wherein the locking means are formed at one of the pivot bearings, including at an upper pivot bearing, and comprise or represent cutouts into which a locking element, including a locking bolt, can be pushed in the corresponding position of the placement part.

12. A crane in accordance with claim 1, wherein a lower pivot bearing is thicker than an upper pivot bearing, with the upper pivot bearing being adapted to take up predominantly horizontal forces and/or the lower pivot bearing being adapted to take up horizontal and vertical forces, including the weight force of the counterweight elements placed on the placement part.

13. A crane in accordance with claim 1, wherein the placement device comprises at least one centering element that is configured to cooperate with a corresponding counter-centering element at the lower side of the counterweight element for the fine positioning of a counterweight element to be placed on the placement device, with the at least one centering element being arranged at an upper side of the placement device and/or being configured as an upwardly protruding projection.

14. A crane in accordance with claim 1, wherein the placement device comprises a ballast element and acts as central ballast, with the placement device comprising two parallel frame parts, to whose front sides a respective placement part is connected in an articulated manner and with the ballast element being arranged between the frame parts.

15. A crane in accordance with claim 1, wherein the crane is a crawler crane.

* * * * *